(12) United States Patent
Romano (10) Patent No.: US 9,433,186 B2
(45) Date of Patent: Sep. 6, 2016

(54) APPARATUS AND METHOD FOR MAINTAINING PET WASTE

(76) Inventor: Christopher Romano, Southbury, CT (US)

(\*) Notice: Subject to any disclaimer, the term of this patent is extended or adjusted under 35 U.S.C. 154(b) by 542 days.

(21) Appl. No.: 13/553,313

(22) Filed: Jul. 19, 2012

(65) Prior Publication Data
US 2013/0019810 A1    Jan. 24, 2013

Related U.S. Application Data (60) Provisional application No. 61/509,380, filed on Jul. 19, 2011.

(51) Int. Cl.
*A01K 1/01* (2006.01)
*A01K 29/00* (2006.01)

(52) U.S. Cl.
CPC .............. *A01K 1/0114* (2013.01); *A01K 1/011* (2013.01)

(58) Field of Classification Search
CPC .............................. A01K 1/0114; A01K 1/011
USPC ........ 119/165, 166, 167, 168, 169, 170, 161
See application file for complete search history.

(56) References Cited

U.S. PATENT DOCUMENTS

| | | | |
|---|---|---|---|
| 4,120,264 A * | 10/1978 | Carter | 119/166 |
| 4,325,325 A * | 4/1982 | Larter | 119/166 |
| 4,846,104 A | 7/1989 | Pierson, Jr. | |
| 4,869,049 A * | 9/1989 | Richards et al. | 53/459 |
| 5,178,099 A | 1/1993 | Lapps et al. | |
| 5,551,375 A | 9/1996 | Flores | |
| 5,662,066 A | 9/1997 | Reitz | |
| 5,690,051 A * | 11/1997 | Fisher et al. | 119/166 |
| 5,752,465 A | 5/1998 | Page | |
| 5,823,137 A | 10/1998 | Rood et al. | |
| 5,911,194 A | 6/1999 | Pierson, Jr. | |

(Continued)

FOREIGN PATENT DOCUMENTS

JP    2006020623    1/2006

OTHER PUBLICATIONS

Litter-Robot: Automatic Self Cleaning Robot Litter Box Demonstration, automated Pet Care Products, Inc.,; http://www.litter-robot.com/.

(Continued)

*Primary Examiner* — Shadi Baniani
(74) *Attorney, Agent, or Firm* — Locke Lord LLP; Gabriel J. McCool (57) ABSTRACT

The invention provides an apparatus and method for maintaining pet waste in a fully-encapsulated environment whereby waste may be removed and litter may be added/replaced in a substantially sealed, dust-free, and clean manner. In one aspect, the pet waste management system comprises a sealed means by which litter may added and/or removed and/or exchange with fresh litter without the substantial release of contaminated dust and materials from the litter system. The invention also provides a vessel or container for receiving spent litter and/or for housing fresh litter where said vessel or container comprises a connection means for sealably connecting the vessel or container to an enclosed pet management system so that litter may be added and/or exchanged therewith. Further, the invention provides a continuous bagging dispenser fitted to a pet management system which allows for continuous removal of pet waste from the pet management system.

4 Claims, 11 Drawing Sheets

(56) References Cited

U.S. PATENT DOCUMENTS

| | | | |
|---|---|---|---|
| 6,052,842 A * | 4/2000 | He | 4/484 |
| 6,082,302 A | 7/2000 | Thaler et al. | |
| 6,126,015 A * | 10/2000 | Haymaker | 209/235 |
| 6,286,457 B1 | 9/2001 | Sugahara | |
| 6,401,660 B1 | 6/2002 | Wolff | |
| 6,401,661 B1 | 6/2002 | Emery | |
| 7,013,835 B2 | 3/2006 | Brokaski | |
| 7,647,889 B2 | 1/2010 | Horanoff | |
| 2002/0139312 A1 * | 10/2002 | Reitz | 119/165 |
| 2005/0235920 A1 * | 10/2005 | Brokaski | 119/166 |
| 2006/0169214 A1 | 8/2006 | Turkalo | |
| 2007/0227457 A1 * | 10/2007 | Waters | 119/166 |
| 2008/0190930 A1 | 8/2008 | Vogel et al. | |
| 2009/0107408 A1 | 4/2009 | Waters | |
| 2009/0199778 A1 | 8/2009 | Kratzer et al. | |

OTHER PUBLICATIONS

PCT International Search Report and Written Opinion dated Dec. 7, 2012 for PCT application No. PCT/US2012/047397.

* cited by examiner

APPARATUS AND METHOD FOR MAINTAINING PET WASTE

PRIORITY AND INCORPORATION BY REFERENCE

This application claims the benefit of earlier filing date of U.S. Provisional Application Ser. No. 61/509,380, filed Jul. 19, 2011, the contents of which are incorporated herein by reference. All documents cited or referenced herein and all documents cited or referenced in the herein cited documents, together with any manufacturer's instructions, descriptions, product specifications, and product sheets for any products mentioned herein or in any document incorporated by reference herein, are hereby incorporated by reference, and may be employed in the practice of the invention.

BACKGROUND OF THE INVENTION

1. Field of the Invention

The present invention relates to an apparatus and method for maintaining pet waste in an encapsulated environment whereby waste may be removed and litter may be replaced in a substantially sealed, dust-free, and clean manner. More in particular, the present invention relates generally to a self-cleaning litter box/pet waste encapsulation device, and, more particularly, to a fully-enclosed, self-cleaning litter box/pet waste encapsulation device, and even more specifically to a fully-enclosed, self-cleaning, self-bagging litter box/pet waste encapsulation device, and even more particularly to a fully-enclosed, self-cleaning, self-bagging litter box pet waste encapsulation device having a continuous bagging dispenser.

2. Description of the Prior Art

The art has seen the development of a great variety of pet and/or cat litter waste management systems developed over the years ranging from basic trays and pans to highly automated and expensive mechanical systems that enable a fully hands-free experience in managing a pet's waste. In general, however, as the scale of automation increases, so do the manufacturing costs and the eventual costs to the consumer/pet owner and are thus not affordable options for most. In addition, highly automated, electromechanical systems are at greater risk of malfunctioning given the increased number of working parts and electronics. So far as is known to the present inventor, there has not yet been the development of a pet and/or cat litter waste management system that offers an affordable system that offers a fully-encapsulated environment which allows pet waste to be removed and litter to be replaced in a substantially sealed, dust-free, and clean manner.

The simplest pet waste management systems available essentially constitute nothing more than shallow pans or containers having sides that are tall enough to store sufficient litter but not so tall as to prevent a pet from stepping into the box. Such systems require the manual removal of waste, typically by using a slotted scoop or similar device. Some litter boxes may include a cover and an opening for an animal, e.g., a cat, to access the litter area for aesthetic purposes, and some litter boxes may include separate sifting or electromechanical automatic raking devices.

There are a number of problems with existing pet waste management systems, no matter their degree of simplicity or complexity, or whether or not they include electromechanical components or other elements intended to ease in the maintenance of the litter and waste. Such problems are generally associated with the collection and disposal of the solid and wet waste materials, the cleaning and/or changing of the litter material itself, and the concomitant odors, dust, spillage, and tracking of litter outside the system by the animal into other areas of the home, all of which expose pet owners and families to waste contaminants, including hazardous bacteria, posing various health threats to an animal's owner and/or family, and especially to pregnant women and their unborn children. Beyond these health risks, litter boxes are generally unpleasant and often are difficult to clean and dispose of the waste, particularly by those who are elderly or are otherwise physically challenged to some degree. Such boxes, being completely uncovered, also emit unpleasant odors, dust, and are unsightly to look at. Moreover, whenever spent litter is changed and replaced with fresh litter, plumes of unsanitary dust are emitted, which may engulf a user and become inhaled. Also, the litter tends to spill or track out of the box when the pet uses and exits the box and/or during times when the user scoops and/or empties the box. The continuous nature of having to maintain such litter boxes only serves to compound and/or magnify the aforementioned health, odor, dust, and spillage problems associated with these systems.

Covered litter boxes avoid the unsightliness of the uncovered box, and also ameliorate at least some problems, including reducing odor and spillage. However, they are still difficult and unpleasant to clean and disposing of the waste remains cumbersome. Covered litter boxes also do not prevent tracking. They have the further problem of requiring the cover to be removed prior to cleaning, which only increases the opportunities to unintentionally come into contact with waste.

Sifting litter boxes have a sifting screen that fits inside a traditional litter box and allows the user to lift the sifting screen out of the box to remove the solid waste while leaving the unused litter behind. Automated raking litter boxes use an automated or semi-automated raking device to sift/rake the waste from the litter. The sifting and raking litter boxes both address the problem of cleaning, but often create even more dust and odor. Disposing of the sifted/raked waste into a receptacle often creates additional spillage. These devices don't address the typical spillage or tracking problems either. Furthermore, the motorized raking systems are often very expensive, tend to clog up, and breakdown.

Some self-cleaning litter boxes utilize a rotating drum or sphere to remove waste from the litter. These devices generally consist of a rotating drum or sphere that receives the litter and includes a sifting mechanism. When the device is rotated, the litter is sifted through the sifting mechanism, separating the waste from the clean litter. This method is effective at separating the waste, although there are inherent problems with the drum and sphere devices. The circular nature of these shapes create shallow areas where clumping litter sticks to the inside of the device causing unsanitary conditions and requiring manual removal. Furthermore, the rotation and sifting creates excessive dust. The user is exposed to the odor, dust, and bacteria through open apertures and when loading litter into the device, and emptying litter out of the device. In addition, many of these types of devices include electromechanical components, which may be prone to malfunction and impart higher costs.

An example of a rotating drum litter box is described in U.S. Pat. No. 7,013,835, which issued to Brokaski on Mar. 21, 2006 for a "Cat litter device." This device includes a filter fixed within the rotating drum for sifting waste from the litter and an exterior waste tube connected to the filter for receiving the sifted waste and transferring it to a collection bag. However, this system fails to address and solve the problems of the prior art systems and does not arrive at the solution of the present invention. In particular, spent litter must be emptied from the system by pouring it through the cat opening, which, like other prior art systems, still causes the formation of plumes of contaminated litter and undesirable contact with waste materials and odors.

Another example is described in U.S. Pat. App. No. 2009107408 A1 for "Apparatus and method to remove animal waste from litter," which was filed on Dec. 30, 2008 by Waters and which provides an apparatus including a rotating drum and helical rake for sifting the waste from the litter. Other examples of rotating drum litter devices having sifting elements are described in U.S. Pat. Nos. 5,752,465 and 7,647,889. These systems also fail to address and solve the problems of the prior art devices and do not arrive at the solution of the present invention, in particular, because none of the systems are encapsulated such that dust, odor, and waste contact are mitigated or avoided.

More in particular, the prior art devices include openings or apertures of various dimensions that allow the odor, dust, litter, and bacteria to escape. Further, none of the prior art include a self-contained, continuous bagging dispenser for the clean, easy, and isolated removal and disposal of waste. The prior art systems also do not include a means for attaching a container or otherwise source of litter directly to the device to facilitate adding new litter or removing old litter from the device while maintaining a sealed environment. None of the prior art includes a semi-rigid disposable liner to eliminate the unsanitary need to periodically wash the interior of the litter box. The prior art also fails to include an anti-spillage/anti-tracking device to quickly and easily return spilled/tracked litter back into the litterbox. Furthermore, the rotating drum devices of the prior art systems rotate about the axis coaxial with the entrance and exit to the device; whereas the device of the present invention rotates about the axis perpendicular to this coaxial axis. The combination of all of these features together in single system having no electromechanical components and which includes a sealed environment for managing litter and removing waste has not previously been proposed in the prior art.

Given the high prevalence of pet ownership in the U.S. and around the world, the present world economic considerations, and the desirability of an easy-to-use, clean, sealed, and hands-free affordable pet waste management system, it is evident that there is a need for a self-cleaning litter box/pet waste encapsulation device that can maintain a sealed environment during pet use, when idle, when removing waste and changing litter, and through all the various actions associated with owning and maintaining a litter box and which does not require electromechanical components which are susceptible to malfunction.

As will be appreciated, none of these prior patents even address the problem faced by applicant let alone offer the solution proposed herein.

SUMMARY OF THE INVENTION

The inventor has conceived of and reduced to practice a novel and nonobvious apparatus and method for maintaining pet waste in a fully-encapsulated environment whereby waste may be removed and litter may be added/replaced in a substantially sealed, dust-free, and clean manner. In a particular embodiment, the pet waste management system comprises a sealed means by which litter may added and/or removed and/or exchange with fresh litter without the substantial release of contaminated dust and materials from the litter system.

In yet another aspect, the present invention relates to a vessel or container for receiving spent litter and/or for housing fresh litter where said vessel or container comprises a connection means for sealably connecting the vessel or container to an enclosed pet management system so that litter may be added and/or exchanged therewith.

In still another aspect, the present invention relates to a continuous bagging dispenser fitted to a pet management system which allows for continuous removal of pet waste from the pet management system.

In yet another aspect, the present invention relates to a self-cleaning litter box/pet waste encapsulation device, and, more particularly, to a fully-enclosed, self-cleaning litter box/pet waste encapsulation device, and even more specifically to a fully-enclosed, self-cleaning, self-bagging litter box/pet waste encapsulation device, and even more particularly to a fully-enclosed, self-cleaning, self-bagging litter box/pet waste encapsulation device having a continuous bagging dispenser.

One object of the present invention is to provide a self-cleaning litter box/pet waste encapsulation device having a rotating housing and sifter/funnel device for mechanically separating waste from clean litter within the litter box.

It is another object of the present invention to provide such a self-cleaning litter box/pet waste encapsulation device that maintains a completely sealed and enclosed environment when idle, during pet use, and during the waste removal and disposal process.

It is yet another object of the present invention to provide such a self-cleaning litter box/pet waste encapsulation device that includes an aperture fitted with a pet door to allow a pet into the housing while keeping odors, dust, litter, and waste within.

It is still another object of the present invention to provide such a self-cleaning litter box/pet waste encapsulation device that includes a continual pre-loaded bagging dispenser that allows the user to remove waste repeatedly without the need to individually load bags, trays or other waste receptacles for each waste removal cycle.

It is another object of the present invention to provide such a self-cleaning litter box/pet waste encapsulation device that includes a fitted aperture designed to accept the opening of a litter bucket or container so as to allow total litter replacement without spilling litter or emitting dust or odor.

It is another object of the present invention to provide such a self-cleaning litter box/pet waste encapsulation device that includes a fitted litter container designed to be accepted by the opening of a litter box aperture so as to allow total litter replacement without spilling litter or emitting dust or odor. In certain embodiments, the pet waste encapsulation device and the litter container each comprise complementary means for coupling or attaching one to the other, preferably to make a sealed connection that avoids the spilling of litter and/or escape of dust and/or odors when in use, e.g., when litter is exchanged or transferred between the system and the container.

In certain embodiments, the litter vessel or container of the invention is adapted to be reusable. In certain embodiments, the litter vessel or container may be configured to be refilled with fresh litter from a litter source (e.g., bulk litter source) for transferring into an enclosed pet management system adapted to receive said vessel or container. In certain other embodiments, the litter vessel or container may be adapted to receive fresh litter in the form of a package or pliable insert that contains a quantity of purchased litter, which may then be transferred into a pet management system adapted to receive said vessel or container. Such embodiments reduce the overall cost and environmental waste and impact through the repeat use of a single litter vessel or container. In this embodiment, the enclosed pet waste management system can include self-cleaning litter box/pet waste encapsulation device as embodied herein, or it can include any suitable pet waste or litter system so long as it is adapted to be maintained as an enclosed, sealed environment in which the litter resides and that a sealable connection may be made between it and the litter vessel or container to allow for transfer and/or exchange of litter in a sealed environment. The sealable connection can be achieved by any suitable means in the art, including fixing each the litter vessel or container and the connecting point on the enclosed litter waste system with complementary means for forming a connection, such as threads, clamps, clasps, hooks, Velcro, and the like. The litter waste system may also include a flange and/or a gasket or the like to assist in forming a seal between it and the litter vessel/container, or vice versa. So long as a sealed connection can be made which can be disconnected as well, any reasonable means known in the art may be used to achieve this function.

In still another aspect, the present invention provides a method for operating a pet waste management system comprising (a) sealably connecting a litter container to a pet waste management system, wherein both the litter container and the pet waste management system comprise complementary means for forming a sealed connection, (b) adding or removing litter to or from the pet waste management system from or to the litter container, and (c) removing the litter container from the pet waste management system.

It is another object of the present invention to provide such a self-cleaning litter box/pet waste encapsulation device that includes a container insert that fits inside the litter container allowing for the reuse of the container thus reducing cost, waste, and environmental impact. The container insert may house fresh or new litter, for example, the container insert may be a pliable soft consumer package containing a new quantity of fresh litter for using in connection with the litter container, which may then be used to form a sealed connection with the self-cleaning litter box/pet waste encapsulation device of the invention, or alternatively, with any compatible enclosed litter box system that is adapted or designed to form a sealed connection with the litter container (containing the insert of litter). In this manner, a retailer may sell replacement litter in the form of the litter insert, which may then used together with the litter container and a compatible enclosed litter system, e.g., the self-cleaning litter box/pet waste encapsulation device of the invention.

It is another object of the present invention to provide such a self-cleaning litter box/pet waste encapsulation device that includes a litter top-off container that contains smaller quantities of litter and inserts into the waste opening so as to allow supplemental litter additions without spilling litter or emitting dust.

It is another object of the present invention to provide a semi-rigid disposable liner to the interior of the device having enough rigidity to hold its shape while inverted and to resist the pulling and scratching of a cat's claws when digging so as to clean the soiled interior of the device without traditional washing.

It is another object of the present invention to provide an anti-tracking/anti-spillage stair/ramp to allow for the quick, clean, and easy collection and return of spilled and tracked litter back into the litterbox. In one embodiment, the stair/ramp has a floor level tapered edge like a dustpan, a hinged connection to the device, and fitted to seal the aperture when closed.

It is but another object of the present invention to provide such a self-cleaning litter box/pet waste encapsulation device that is easy to operate and clean.

It is another object of the present invention to provide such a self-cleaning litter box/pet waste encapsulation device that is inexpensive to manufacture.

It is yet another object of the present invention to provide such a self-cleaning litter box/pet waste encapsulation device that allows for the easy addition or removal of waste and/or litter from the interior of the device.

It is yet still another object of the present invention to provide such a self-cleaning litter box/pet waste encapsulation device manufactured from a sturdy material such that it may be roughly treated by a user and/or pet yet still operate normally.

It is another object of the present invention to provide such a self-cleaning litter box pet waste encapsulation device that rotates about an axis perpendicular to the sides of the device to thereby facilitate the operation of the device.

It is yet another object of the present invention to provide a self-cleaning litter box/pet waste encapsulation device wherein the pivots about which the housing rotates in the support frame are above the center of the housing when the housing is in an upright resting position ready to receive a pet therein so the housing can rest on a common floor with the support frame and so as to provide clearance between the floor and the housing during rotation of the housing.

To the accomplishments of the foregoing objects and advantages, the present invention, in brief summary, comprises in one aspect a self-cleaning litter box/pet waste encapsulation device having a main housing that rotates on a frame. The housing includes an aperture fitted with a pet door to allow a pet into the housing while keeping odors, dust, and litter within. Disposed within the housing is a sifter/funnel configured so that when the housing is rotated 90 degrees the litter is sifted; and when it is rotated 180 degrees, the solids slide out one end of the sifter/funnel through a waste opening into a disposable plastic tube housed and dispensed at the top of the housing. The clean litter is retained within by an enclosed solid collar on the sifter/funnel to prevent it from being ejected from the housing. The plastic tube comprises an elongated thin plastic tubing that is compressed into a ring-shaped structure/toroid, allowing one end of the tube to be withdrawn to a desired length. When the waste is deposited into the plastic tube, the user pulls more tubing out, twists the tube around the solid waste, and slides the entwined tube through a fixed cutter. Once the bagged waste is cut free from the tubing, the user may tie a knot in the cut end of the tube to seal in the waste, and tie another knot in the new end of the compressed plastic tube to receive more waste and reseal the housing. The housing is then rotated back to the original position, returning the unsoiled particles of litter back to the bottom of the device readying it for further use.

These and other embodiments are disclosed or are obvious from and encompassed by, the following Detailed Description.

BRIEF DESCRIPTION OF THE DRAWINGS

The foregoing and still other objects and advantages of the present invention will be more apparent from the detailed explanation of the preferred embodiments of the invention in connection with the accompanying drawings, wherein.

DETAILED DESCRIPTION OF THE INVENTION

Figure 1:
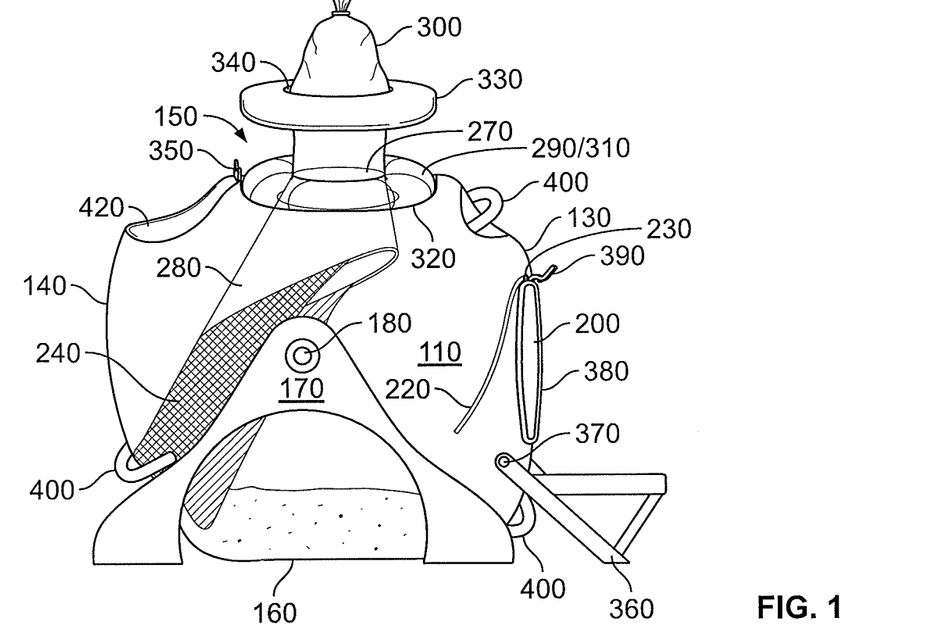
FIG. 1 is a schematic side view through an exemplary embodiment of a self-cleaning litter box/pet waste encapsulation device constructed in accordance with the present invention.
Figure 2:
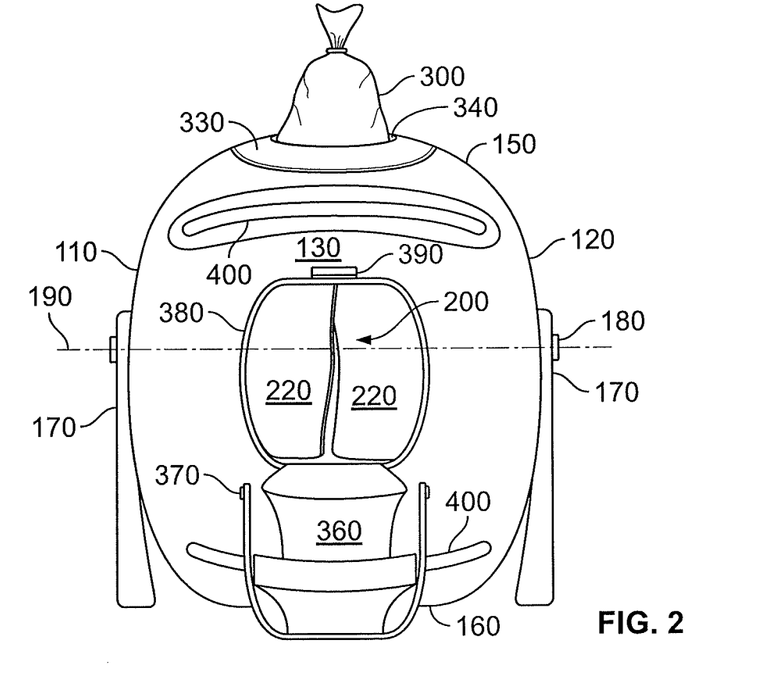
FIG. 2 is a schematic front view of the self-cleaning litter box/pet waste encapsulation device of FIG. 1.
Figure 3:
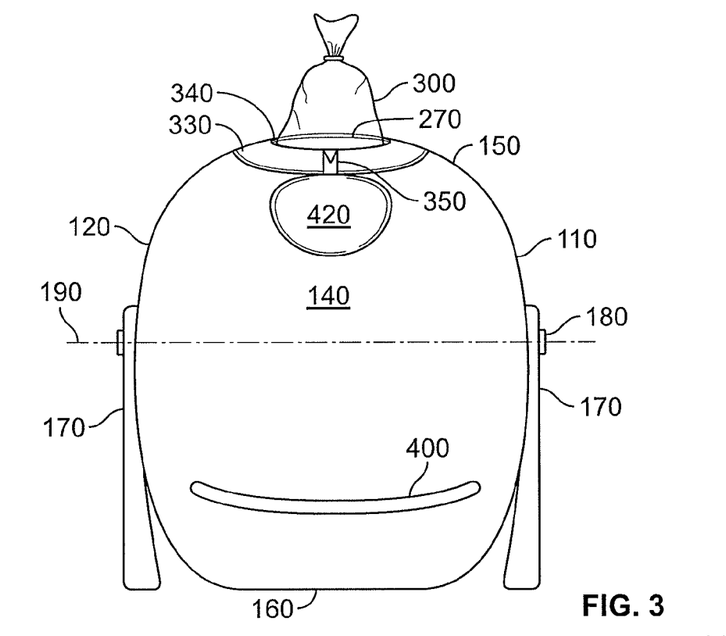
FIG. 3 is a schematic rear view of the self-cleaning litter box/pet waste encapsulation device of FIG. 1.
Figure 4:
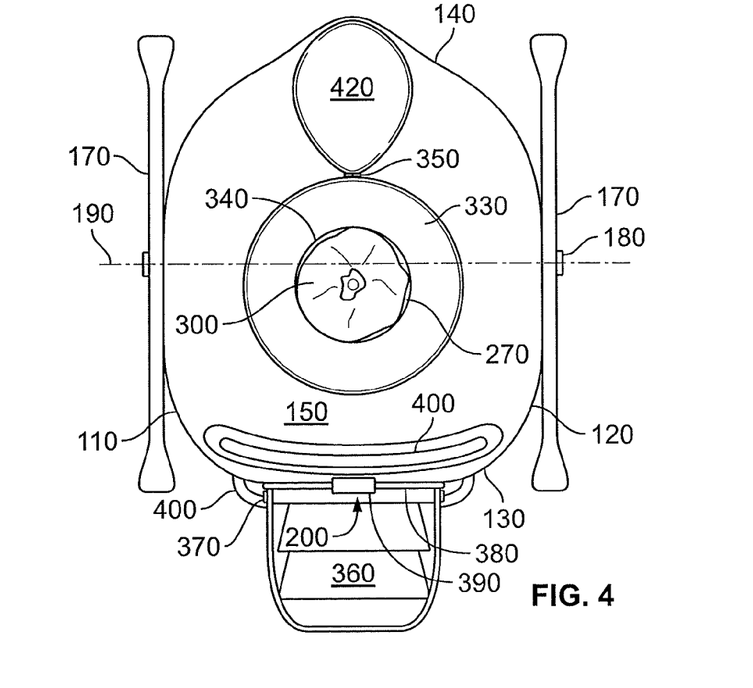
FIG. 4 is a schematic top view of the self-cleaning litter box/pet waste encapsulation device of FIG. 1.

Referring to the drawings and, in particular, to FIG. 1 thereof, the self-cleaning litter box/pet waste encapsulation device of the present invention, referred to generally by reference numeral 10, is illustrated. The self-cleaning litter box/pet waste encapsulation device 10 comprises a housing 100 having two sides 110, 120, a front section 130, a rear section 140, a top 150 and a bottom 160. In the preferred embodiment, the self-cleaning litter box/pet waste encapsulation device 10 and all its component parts are made of plastic (with exception of the bag cutter blade 350) so as to keep the cost of manufacture down and so as to keep the self-cleaning litter box/pet waste encapsulation device 10 as hygienic as possible. Examples of plastics that may be used include, but are not limited to, Polyethylene Terephthalate (PET), High-Density Polyethylene (HDPE), Polyvinyl Chloride (PVC), Low-Density Polyethylene (LDPE), Polypropylene (PP), Polystyrene (PS), Polycarbonate (PC), and Polylactide (PL). However, it is contemplated that other materials, such as metals, may be used so as to improve the sturdiness or aesthetic appeal of the device.

Regardless of the materials used to manufacture the self-cleaning litter box/pet waste encapsulation device 10 and its associated components, the housing 100 is rotatably mounted to a support base or frame 170 by pivots 180, which pivots 180 define an axis 190 about which the housing 100 rotates.

An aperture 200 is provided within the front section 130 of the housing 100, which aperture 200 provides access into and out of the interior chamber of the housing 210. The interior 210 is comparably sized to standard covered litter boxes, although it may be smaller or larger as required by cats or other types of pets of different sizes. The aperture 200 can be extended by means of an aperture flange 201 (see FIG. 15) which provides structural support to the aperture 200 and facilitates the interchanging of litter. Additionally, the outer edge of the aperture flange 201 can be fitted with compressible seal 202. A door 220 is affixed to the aperture 200 by means of hinges, pivots, or flexible materials 230 which allow the door 220 to swing in and out to thereby allow the pet easy access into and out of the housing 210. The door 220 is shaped to correspond with the shape of the aperture 200 to keep odors and dust within the interior 210.

In certain other embodiments, aperture 200 can comprise an attachment or coupling means for forming a sealed connection with litter container 430 (see FIGS. 10-15). The litter container 430 can have a complementary attachment or coupling means that, when joined to the coupling means of aperture 200, forms a sealed connection which will retain the litter container 430 against the aperture, until the user chooses to disconnect the litter container from the aperture. The complementary attachment or coupling means can take any suitable form, including threading (oriented with any handedness), snaps, clasps, clips, buckles, buttons, or other suitable fasteners. The litter container and/or the aperture also may be fitted with a gasket or otherwise sealing means to allow for an airtight connection between the litter container and the aperture. The attachment or coupling means on the aperture 200 may be integrated with the aperture flange 201.

A sifter 240 is disposed in a fixed position within the interior 210 for sifting the contents of the self-cleaning litter box/pet waste encapsulation device 10 and separating the clean litter 250 from the waste solids 260. In the preferred embodiment, the sifter comprises a plurality of evenly spaced strips, slots, or bars wide enough to allow the clean litter 250 to pass between them but narrow enough to trap the waste solids 260. Of course, other sifter 240 configurations are possible, such as strainer-type sifters. The sifter 240 is shaped and positioned within the interior 210 such that, when the housing 100 is rotated 90 degrees about the pivots 180, gravity forces the contents of the interior 210 to pass through the sifter 240, thereby separating the clean litter 250 from the waste solids 260. When the housing 100 is rotated another 90 degrees about the pivots 180, gravity forces the separated waste solids 260 to pass across the sifter 240 and through a waste opening 270 disposed within the top 150 of the housing 100 while the clean litter 250 is retained by a solid closed collar 280 disposed at the end of the sifter 240.

Figure 13:
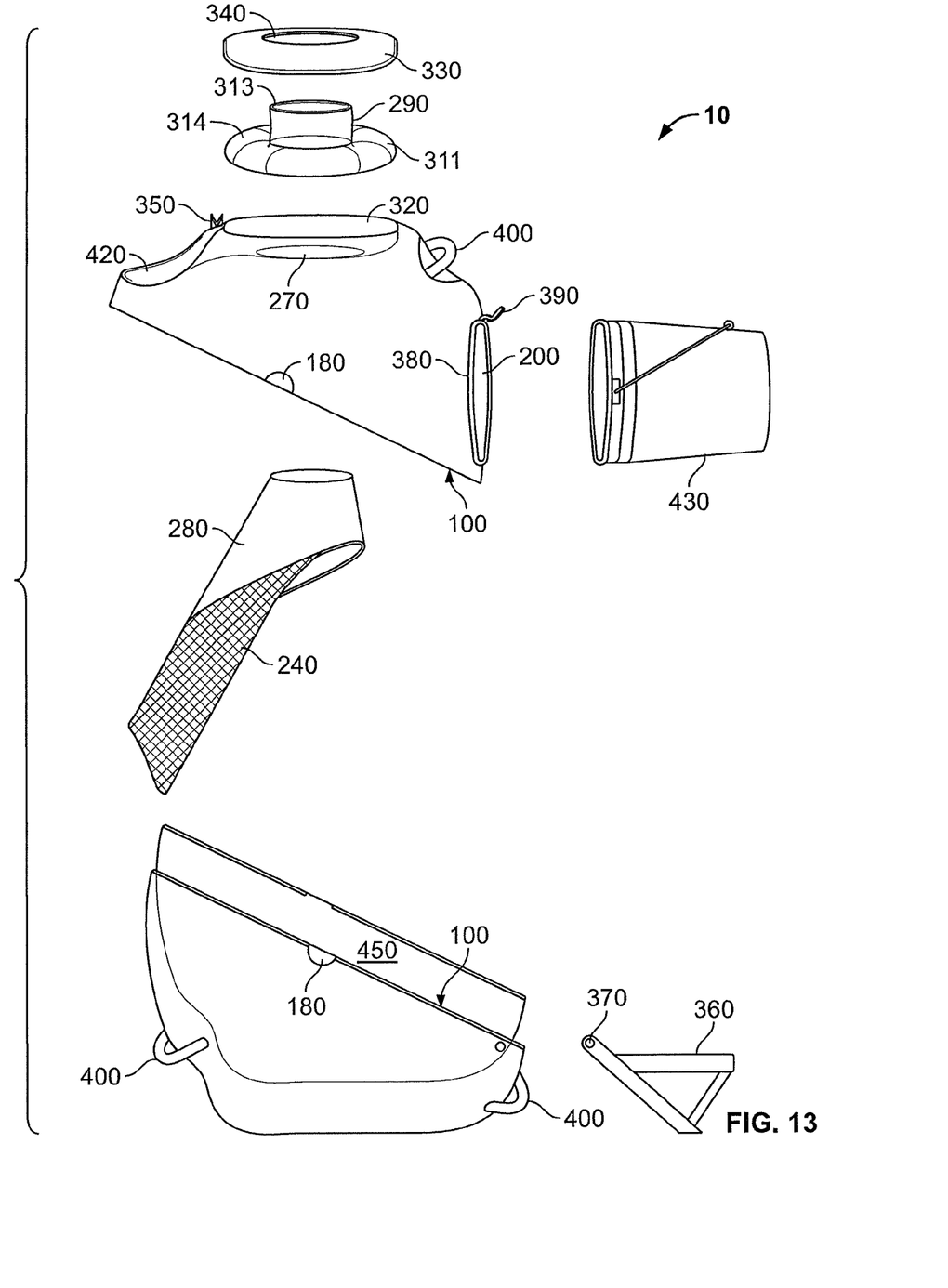
FIG. 13 is a schematic exploded side view of the self-cleaning litter box/pet waste encapsulation device of FIG. 1 indicating the component parts of the device.
Figure 14:
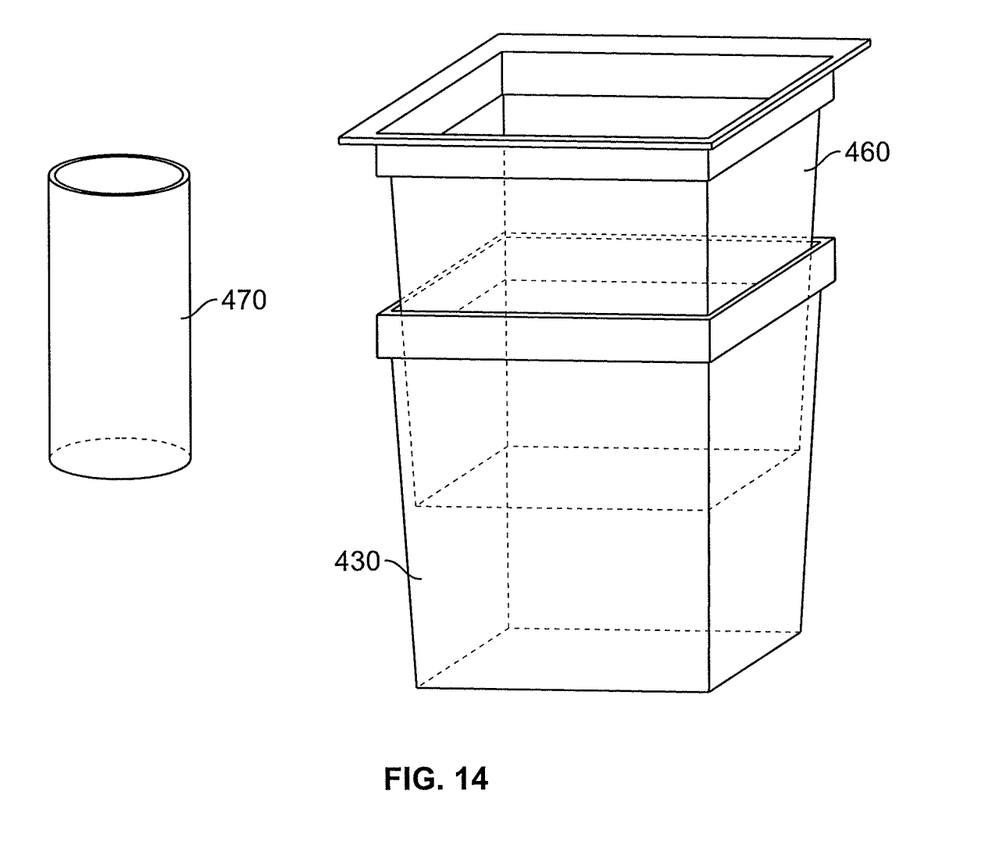
FIG. 14 is a schematic exploded side view of the litter container and container insert. The figure also shows an embodiment of the top-off container (left image).
Figure 16:
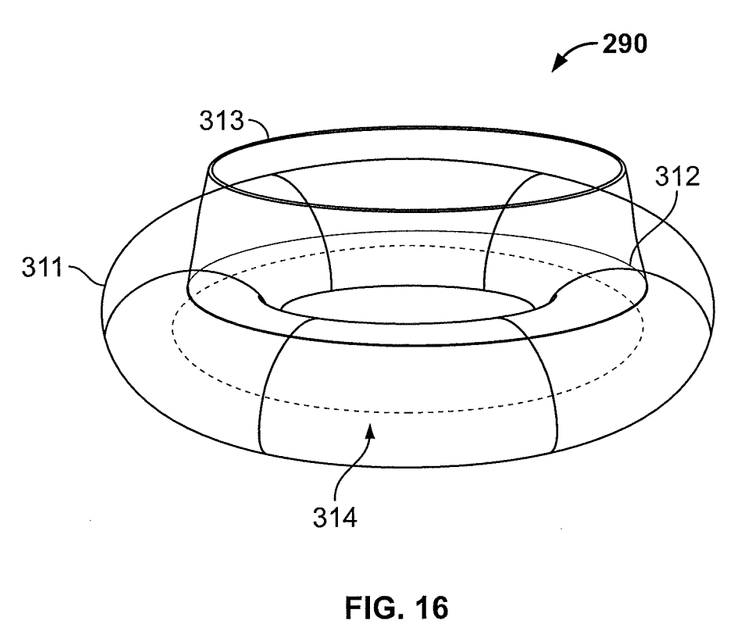
FIG. 16 is an isometric view of the compressed plastic tubing.

In a preferred embodiment, referring to FIG. 16 thereof, a disposable, replaceable tube bag 290 is disposed about the waste opening 270 for receiving the waste solids 260 ejected from the interior 210 of the self-cleaning litter box/pet waste encapsulation device 10. Also in the preferred embodiment, the tube bag 290 comprises a elongated plastic tube 300 compressed into a toroid 310. The end of the plastic tube 300 is wrapped around the compressed toroid 310 creating a self packing 311 to hold the compressed plastic tube 300 in its toroidial shape. A heat weld 312 secures the self packing 311 leaving enough of one end of the plastic tube 300 beyond the heat weld 312 to make a pull tab 313. A perforation 314 of the self packing 311, opposite the side of the pull tab 313, allows the plastic tube 300 to be released when the pull tab 313 is pulled. Referring to FIG. 13, the tube bag 290 is housed in a reservoir 320 around the waste opening 270 at the top 150 of the housing 100. A slotted cover 330 keeps the tube bag 290 in place. Drawing the pull tab 313 through the slotted cover 330 causes the perforation 314 to tear dispensing the plastic tube 300. A cutter 350 is also provided next to the waste opening 270 for cutting the plastic tube 300.

Referring to FIG. 1, multiple handles 400 are also disposed around the surface of the housing 100 to allow a user to rotate the housing 100 about the pivots 180. The handles 400 are situated so as to allow the user maximum leverage to turn the housing 100 but not to interfere with the operation of the self-cleaning litter box/pet waste encapsulation device 10. In the preferred embodiment, handles 400 are positioned on the top 150 and bottom 160 of the housing 100 for ease of operation. In addition, the handles 400 can be disposed on the rear 140, the sides 110, 120 of the device 10 such that, in cooperation with frame 170, they prevent the housing 100 from being rotated past the desired rotational angles for operation.

In alternative embodiments, a crank or lever or an electric motor may be provided to rotate the housing 100 about the pivots 180, although such devices add to the cost of manufacture and the complexity of the device 10.

Additional features are contemplated for further facilitating the operation and maintenance of the self-cleaning litter box/pet waste encapsulation device 10 as well as eliminating odors, dust and spillage from the self-cleaning litter box/pet waste encapsulation device 10 during use as well as during replacement or removal of litter. For example, an anti-tracking stair/ramp 360 (FIG. 15) may be attached to the housing 100 below the aperture 200 to allow for easy access by a pet and to collect the tracked litter upon the pet's exit. The anti-tracking stair/ramp 360 has a floor level step with a tapered edge 361 designed to receive floor sweepings for additional convenience. The anti-tracking stair/ramp 360 may be attached to the housing 100 by means of a hinge 370 that allows the anti-tracking stair/ramp 360 to swing up and seal the compressible seal 202 of the aperture flange 201, thereby returning the tracked litter into the interior 210 and sealing the self-cleaning litter box/pet waste encapsulation device 10 for rotation. A semi-rigid disposable liner 450, illustrated in FIG. 13, may also be added to the interior of the housing 100 which allows the user to simply replace the semi-rigid disposable liner 450 when continual use causes the interior of the housing to become soiled with waste. The semi-rigid disposable liner may be constructed from any suitable material, including Polyethylene Terephthalate (PET), High-Density Polyethylene (HDPE), Polyvinyl Chloride (PVC), Low-Density Polyethylene (LDPE), Polypropylene (PP), Polystyrene (PS), Polycarbonate (PC), or Polylactide (PL).

Figure 15:
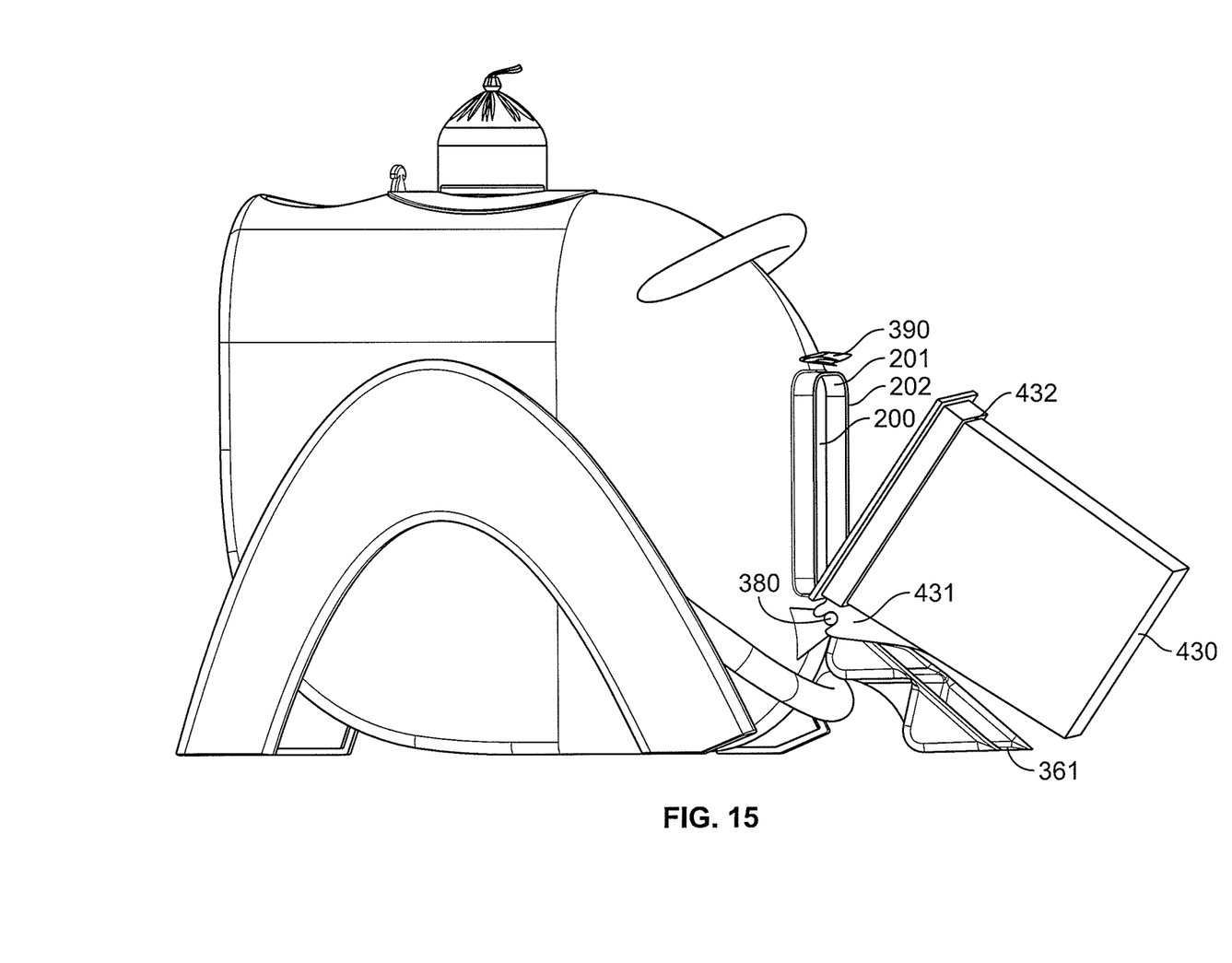
FIG. 15 is a side view of the litter container as it is brought into contact with the opening of the waste management system. Once attached, the litter container will form a sealed connection due to the complementary means on the container and on the system for forming such a sealed connection.

Referring to FIG. 15, the aperture 200 preferably includes a container attachment means 380 sized and shaped to connect to and pivot within the receiving arm 431 of a litter container 430 that contains the clean litter 250 such as newly purchased litter (or which may be an empty container 430 for receiving spent litter from the system) until the flange 201 fits snugly within the open top of the container 430. The litter container 430 contains a stepped in seat 432 arranged to accept the aperture flange 201 and engage the compressible seal 202 creating a sealed and flush transition to transfer litter in and out of the self-cleaning litter box/pet waste encapsulation device 10 without odor, dust or spillage. The arrangement of these components allows a user to save and re-use the original litter container 430 to remove the entire contents of the litter box 10 without odor, dust or spillage as well. A lock and release flange 390 is provided to alternatively lock the litter container in place and to allow a user to disconnect the container from the device 10 and replace the original cover on the container to thereby seal and dispose of the entire contents of the interior 210. The same procedure may be utilized to fill the interior 210 with new litter 250 without exposure to dust or spills.

In alternative embodiments, various interchangeable fittings may be provided so as to accept litter buckets of various sizes and shapes. The invention contemplates that the device 10 and container 430 may be connected to form a sealable connection by any suitable means, which may include snaps, slides, friction fittings, threadings, buckles, belts, elastic bands, straps, clasps, screws, thumb turns, clasps, hooks, latches, pivots, hinges, Velcro, magnets, clamps, clips, twist-locks, elastic diaphragms, or the like without deviating from the spirit of the invention. In addition, the device 10 and container 430 may be able to achieve a sealed connection using a compressible gasket or sealing means that forms an airtight seal when the container is connected with the aperture 200 of the device 10.

The container insert 460 (FIG. 14) may be constructed with a thin and/or environmentally conscious material and may be packed with clean litter 250 and inserted into an empty litter container 430 to reduce environmental impact, and cost through the reuse of litter container 430 and recycling of the container insert 460. This allows the user to reuse the litter container 430 as long as desired before discarding or recycling.

A litter top-off container 470 that contains smaller quantities of clean litter 250 and inserts into the waste opening 270 (FIG. 1) allowing supplemental litter additions without spilling litter or emitting dust. The litter top-off container 470 may be further fitted with various covers or lids that allow for the passage of the litter once the top-off container 470 is inserted into or connected with the waste opening 270.

In operation, a user withdraws a length of the plastic tube 300 through the slot 340 in the cover 330 and ties a knot at the top of the plastic tube 300, which knot serves as the bottom of the disposable trash receptacle for the waste solids 260. The knot also serves to prevent odors and dust from escaping from the interior of the housing 210.

In alternative embodiments, a crimp, clamp, tie, staple, or heat seal, or other like or equivalent means, may be used to seal the end of the tube.

In yet another alternative embodiment, a heat sealing tube cutter may be provided to seal the end of the elongated plastic tube 300. The heat sealing tube cutter comprises two sets of heat sealing elements with a scissor cutter disposed between the sets of heating elements. The heat sealing tube cutter is hinged on one side is mounted between the waste opening 270 and the tube reservoir 320. Once the waste solids 260 have been ejected into the withdrawn portion of the plastic tube 300, the user rotates the housing 100 back to its original position. This action causes the filled plastic tube 300 to be securely stationed in the waste bag seat 420, returns the clean litter 250 to the bottom 160 of the housing, and positions the plastic tube 300 over the stationary arm of the double sealing tube cutter. The waste 260 may then be encapsulated and cut free by pressing the pivoted arm of the tube cutter down over the plastic tubing 300 sealing the waste 260 into waste bag 300, cutting it free from the plastic tube, and sealing the end of the remaining tube, thus creating the bottom of the waste bag for the next cycle. The user may then dispose of the encapsulated waste in any household trash receptacle without any exposure to odor, dust, litter, waste, or bacteria.

Figure 5:
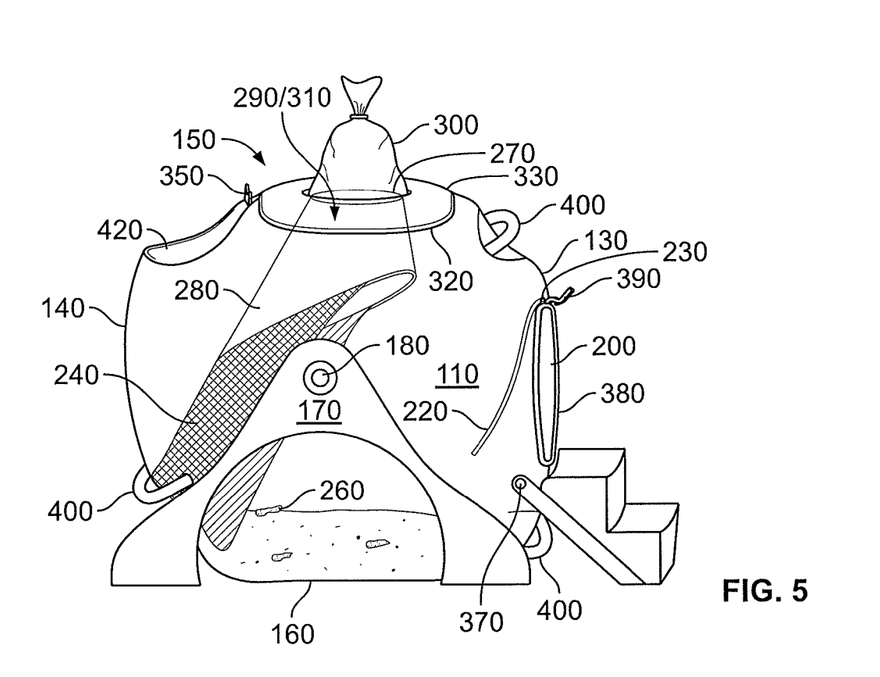
FIG. 5 is a schematic side view of the self-cleaning litter box/pet waste encapsulation device of FIG. 1 at 0 degrees, position "A".
Figure 6:
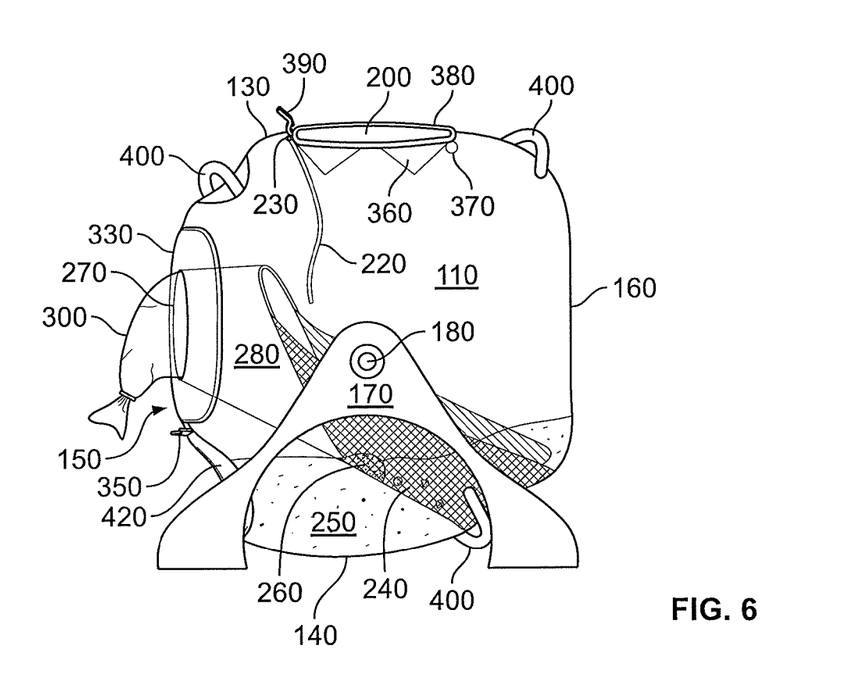
FIG. 6 is a schematic side view of the self-cleaning litter box/pet waste encapsulation device of FIG. 1 rotated to 90 degrees, position "B".
Figure 7:
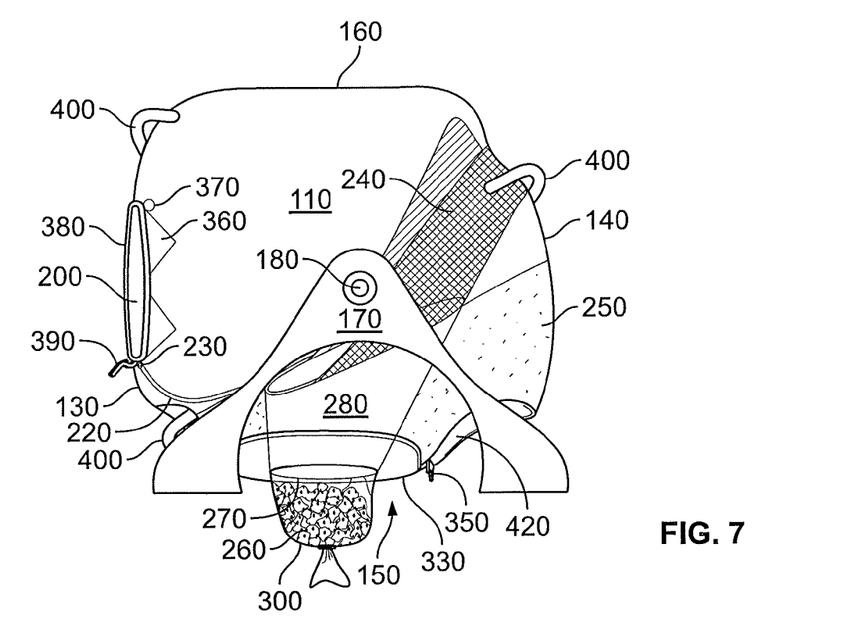
FIG. 7 is a schematic side view of the self-cleaning litter box/pet waste encapsulation device of FIG. 1 rotated to 180 degrees, position "C".
Figure 8:
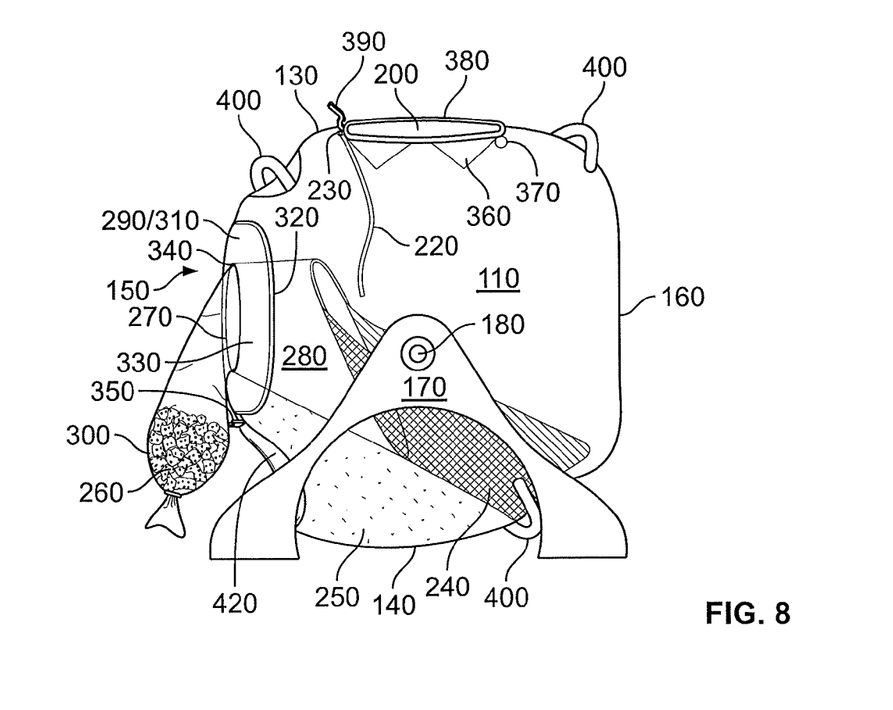
FIG. 8 is a schematic side view of the self-cleaning litter box/pet waste encapsulation device of FIG. 1 rotated back to 90 degrees, position "D".

A pet may use the self-cleaning litter box/pet waste encapsulation device 10 by entering and leaving through the aperture 200 (FIG. 5/Position "A"). After the pet is done with the device 10, the user may sweep any tracked litter into the bottom step and hinge close the anti-tracking stair/ramp 360, returning any spillage or tracked litter back into the litter box and sealing the aperture. Then the user grasps the handles 400 and rotates the entire housing 100 ninety degrees about the axis 190 such that the aperture is now at the top of the device 10 (FIG. 6/Position "B"). Through this operation, the litter is forced by gravity through the sifter 240, and the clean litter 250 is separated from the waste solids 260. The housing is then rotated another ninety degrees about the axis 190 such that the aperture 200 is now at the back of the device 10 (FIG. 7/Position "C"). Through this additional rotation, the clean litter 250 is retained within the interior of the housing 210 by the solid closed collar 280 and the waste solids 260 are forced by gravity through the inside of the solid closed collar 280 continuing through the waste opening 270 and into the withdrawn portion of the plastic tube 300 of the tube bag 290. It should be appreciated that this 180 degree rotation need not be done in two stages—the housing 100 may be rotated in one continuous and smooth operation. It should further be appreciated that preferably the apparatus is implemented such that there is sufficient clearance between the withdrawn portion of the plastic tube 300 (which contains the waste in Position "C") and the surface upon which the frame 170 sits to allow freedom of movement when rotating the housing in and/or out of Position C.

Figure 9:
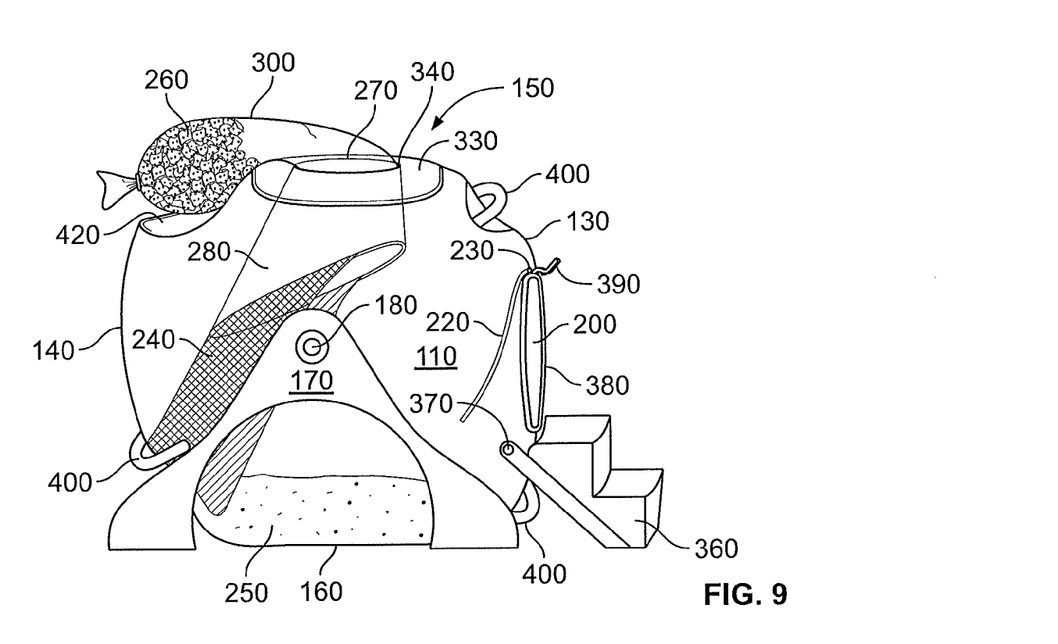
FIG. 9 is a schematic side view of the self-cleaning litter box/pet waste encapsulation device of FIG. 1 rotated back to 0 degrees, position "E".
Figure 10:
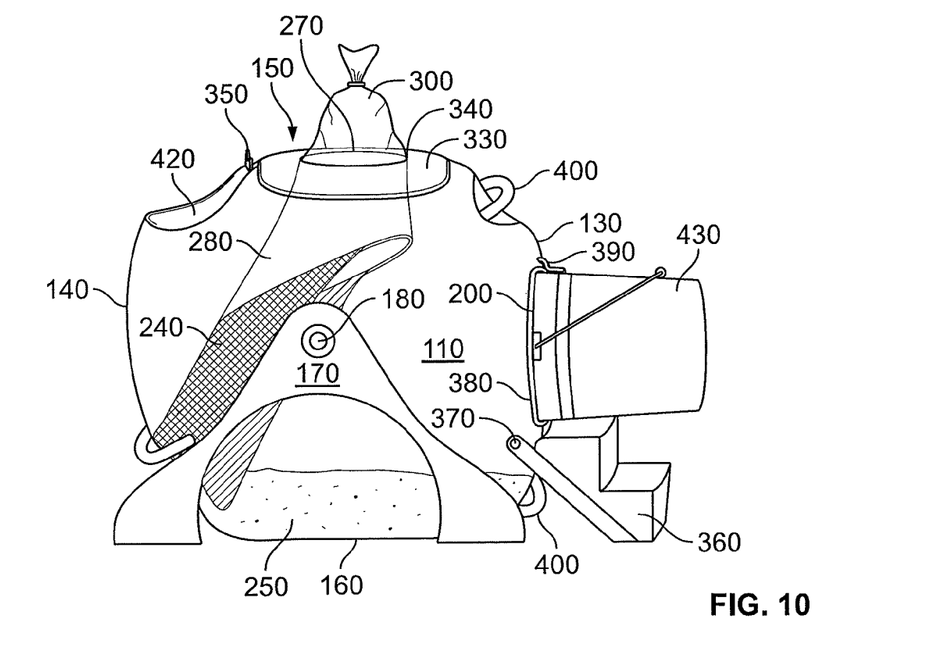
FIG. 10 is a schematic side view of the self-cleaning litter box/pet waste encapsulation device of FIG. 1 with the litter bucket attached, position "F".

Once the waste solids 260 have been ejected into the withdrawn portion of the plastic tube 300, the user rotates the housing 100 back to its original position (FIG. 9/Position "E"). This action causes the filled plastic tube 300 to be securely stationed in the waste bag seat 420 and returns the clean litter 250 to the bottom of the housing 160. The waste may then be completely encapsulated by twisting the plastic tube 300, separating the filled portion from the remaining plastic tube. The entwined plastic tube 300 may then be slid through the cutter 350, thereby freeing the bagged waste solids 260. The user may then tie a knot in the cut end of the freed plastic tube 300, and dispose of the waste in any household trash receptacle without any exposure to odor, dust, litter, waste, or bacteria. At this time, the user may re-open the anti-tracking stair door 360 for the pet's next use. Upon returning the anti-tracking stair door 360 to its open position, the pet door 220 returns to the aperture by way of gravity and continues to maintain a sealed aperture. An additional knot may be tied at the open end of the remaining plastic tube 300 completely sealing the device 10 until the pet's next use.

Figure 11:
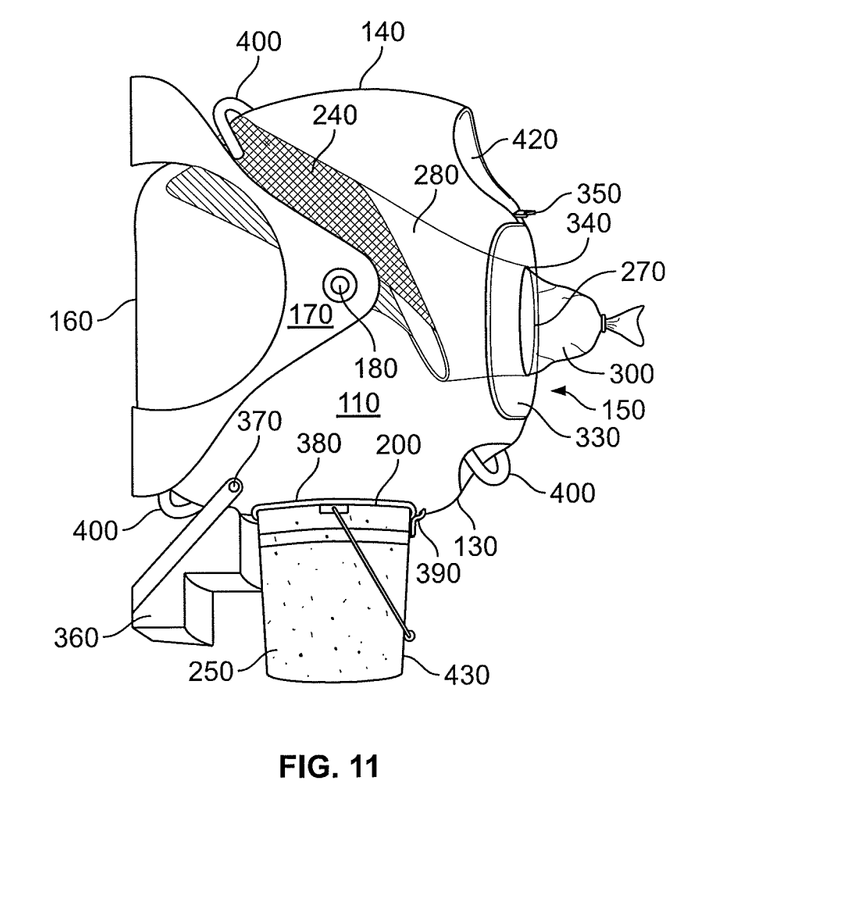
FIG. 11 is a schematic side view of the self-cleaning litter box/pet waste encapsulation device of FIG. 1 with the litter bucket attached, position "G".
Figure 12:
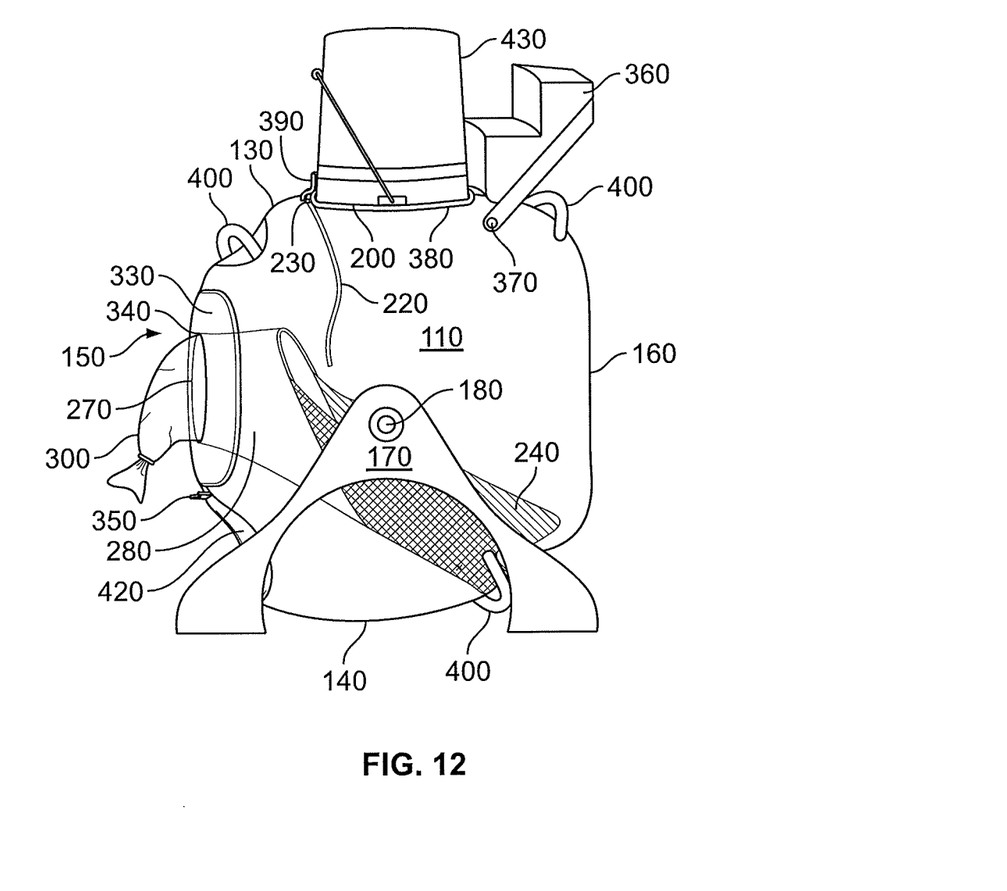
FIG. 12 is a schematic side view of the self-cleaning litter box/pet waste encapsulation device of FIG. 1 with the litter bucket attached, position "H"

Clean litter 250 may be added to the interior of the device 10 by various methods. For example, Referring to FIG. 15 the receiving arm 431 of the clean litter container 430 may be attached to the container attachment means 380 and inverted so that the entire empty device 10 sits on top of the full upright litter container 430 (FIG. 11/Position "G"). Then the user tilts the device 10 back down onto the legs of the frame 170 and rotates the device 10 by way of the pivot 180 until the clean litter 250 pours into the interior 210 without any exposure to the elements within (FIG. 12/Position "H"). The same methods may be used in reverse to remove the litter from the interior without any exposure to the elements within. Alternatively, the litter may be poured from the top-off container 470 (FIG. 14) into the housing 100 through the waste opening 270 prior to tying the open end of the remaining plastic tube 300. The housing 100 may also be rotated 90 degrees about the axis 190 such that the aperture 200 is at the top of the device 10. Clean litter 250 may then be poured into the interior 210.

The pivots 180 about which the housing 100 rotates in the support frame 170 are off-center and above the center of the housing 100 when the housing 100 is in an upright resting position ready to receive a pet therein, or the 0 degree position "A." This allows the housing 100 to rest on a common floor with frame 170, and to provide clearance between the floor and the housing 100 during rotation of the housing 100 as described above.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification be considered as exemplary only, with a true scope and spirit of the invention being indicated by the following claims.

Incorporation by Reference The contents of all references, patents, pending patent applications and published patents, cited throughout this application are hereby expressly incorporated by reference.

Equivalents Those skilled in the art will recognize, or be able to ascertain using no more than routine experimentation, many equivalents to the specific embodiments of the invention described herein. Such equivalents are intended to be encompassed by the following claims.

What is claimed is:

1. A self-cleaning litter box/pet waste encapsulation device comprising:
   a housing defining an interior chamber to receive and retain litter, wherein said housing comprises a front, back, top, bottom and sides;
   an aperture disposed in the front of said housing, said aperture allows a pet to enter, exit and use the litter box and litter to be deposited within and removed from the interior chamber;
   a door attached to said aperture, said door being sized to correspond with the shape of said aperture to thereby keep odors and dust within the interior chamber;
   a sifter disposed in a fixed position within the interior chamber for sifting the contents of the litter box and separating clean litter from waste solids, wherein said sifter is oriented within said interior such that when said housing is rotated 90 degrees about a rotational axis said sifter separates the waste solids from the clean litter;
   a waste opening disposed on the top of the housing and connected to said sifter, said waste opening being adapted to receive said waste solids, wherein said sifter and said waste opening are further oriented within said interior such that when said housing is rotated 180 degrees about said rotational axis, said waste solids are deposited within a waste bag;

a removable, disposable waste bag comprising an elongated plastic tube compressed into a toroid for receiving and disposing of said waste solids without releasing odors or dust from the interior chamber;

a reservoir disposed about said waste opening for receiving and retaining said toroid;

a slotted cover adapted to cover said reservoir and keep said toroid in place while allowing a portion of said plastic tube to be drawn through a slot in said cover;

a cutter disposed next to said waste opening for cutting a length of said plastic tube;

a support frame, wherein said housing is rotatably attached to said support frame by two pivots disposed on either side of said housing, said pivots defining said rotational axis; at least one handle disposed on the surface of said housing adapted to allow a user to rotate the housing about said two pivots; a litter container for holding litter, said litter container comprising; a housing defining an interior chamber to receive and retain litter, wherein said housing comprises a front, back, top, bottom and sides; an aperture disposed in the top of said housing sized to attach to the aperture of said housing of said litter box; means for joining said litter container to said litter box so as to be able to transfer litter back and forth between said litter container and said litter box within an enclosed environment to prevent the spread of dust and odor; and a release flange for alternatively locking said litter container in place and releasing said litter container.

2. The self-cleaning litter box/pet waste encapsulation device of claim 1, further including an anti-tracking stair/ramp rotatably attached to said housing below said aperture, having a floor level beveled edge.

3. The self-cleaning litter box/pet waste encapsulation device of claim 1, further including a semi-rigid disposable liner for periodically cleaning the interior of the device.

4. The self-cleaning litter box/pet waste encapsulation device of claim 1, wherein the two pivots are above the center of the housing of said litter box when the housing of said litter box is in an upright resting position ready to receive a pet therein so the housing of said litter box can rest on a common floor with the support frame and so as to provide clearance between the floor and the housing of said litter box during rotation of the housing of said litter box.

* * * * *